(12) United States Patent
Shimizu et al.

(10) Patent No.: US 11,777,165 B2
(45) Date of Patent: Oct. 3, 2023

(54) BATTERY

(71) Applicant: Panasonic Intellectual Property Management Co., Ltd., Osaka (JP)

(72) Inventors: Kota Shimizu, Osaka (JP); Takaaki Kassai, Osaka (JP); Kazumichi Shimizu, Osaka (JP); Shinya Geshi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 38 days.

(21) Appl. No.: 17/498,300

(22) Filed: Oct. 11, 2021

(65) Prior Publication Data

US 2022/0149466 A1    May 12, 2022

(30) Foreign Application Priority Data

Nov. 9, 2020  (JP) .................... 2020-186691

(51) Int. Cl.
*H01M 50/186* (2021.01)
*H01M 50/60* (2021.01)

(52) U.S. Cl.
CPC ....... *H01M 50/186* (2021.01); *H01M 50/668* (2021.01)

(58) Field of Classification Search
CPC ............. H01M 50/186; H01M 50/668; H01M 50/152; H01M 50/169; H01M 50/184; H01M 50/107
See application file for complete search history.

(56) References Cited

U.S. PATENT DOCUMENTS

| | | |
|---|---|---|
| 2006/0027800 A1 | 2/2006 | MacPherson et al. |
| 2011/0294002 A1* | 12/2011 | Kim .................... H01M 50/169 429/185 |
| 2017/0187076 A1* | 6/2017 | Li .................... H01M 10/4235 |
| 2018/0247773 A1* | 8/2018 | Lee .................... H01G 4/232 |

FOREIGN PATENT DOCUMENTS

| | | |
|---|---|---|
| JP | 7-105933 | 4/1995 |
| JP | 2002-025601 | 1/2002 |
| JP | 2003-178724 | 6/2003 |
| JP | 2008-509528 | 3/2008 |
| JP | 2015-026022 | 2/2015 |

\* cited by examiner

*Primary Examiner* — Matthew T Martin
*Assistant Examiner* — Bartholomew A Hornsby
(74) *Attorney, Agent, or Firm* — Wenderoth, Lind & Ponack, L.L.P.

(57) ABSTRACT

A battery includes a metal battery can that has a tubular portion having an opening edge portion and a bottom portion; an electrode body that is in the battery can; an electrolytic solution that fills the battery can; and a sealing member that has an outer peripheral surface facing an inner peripheral surface of the opening edge portion of the tubular portion and is configured to seal the opening edge portion. A part of the inner peripheral surface of the opening edge portion and a part of the outer peripheral surface of the sealing member are joined by a melting portion, and a preventing portion is on the outer peripheral surface of the sealing member, the preventing portion being configured to prevent the electrolytic solution from rising toward a position, in which the melting portion is formed.

10 Claims, 4 Drawing Sheets

BATTERY

BACKGROUND

1. Technical Field

The present disclosure relates to a battery.

2. Description of the Related Art

In the related art, batteries having various configurations are known as sealed batteries (see, for example, Japanese Patent Unexamined Publication No. 7-105933).

Such a battery in the related art has a battery can with an open end, and the open end of the battery can is sealed. The following method is known as a method of sealing the open end. After an electrode body is accommodated in the battery can, the diameter of the battery can is reduced inward near the open end of the battery can. Due to this reduced diameter, an annular-shaped ridge is formed on the inner peripheral surface of the battery can, and a gasket and a sealing member are placed on the ridge. The open end of the battery can is caulked with the sealing member via the gasket to form a caulking portion on the sealing member. Therefore, it is possible to seal the battery and manufacture a sealed type battery.

SUMMARY

A battery according to one aspect of the present disclosure includes a metal battery can, an electrode body, an electrolytic solution, and a sealing member. The battery can has a tubular portion having an opening edge portion at one end of the tubular portion and a bottom portion closing the other end of the tubular portion. The electrode body is accommodated in the battery can. The battery can is filled with the electrolytic solution. The sealing member seals the opening edge portion of the tubular portion of the battery can. The sealing member is disposed such that an outer peripheral surface of the sealing member faces an inner peripheral surface of the opening edge portion. A part of the inner peripheral surface of the opening edge portion and a part of the outer peripheral surface of the sealing member are joined by a melting portion. Further, a preventing portion, which prevents the electrolytic solution from rising toward a position, in which the melting portion is formed, between the inner peripheral surface of the opening edge portion and the outer peripheral surface of the sealing member, is provided on the outer peripheral surface of the sealing member. The preventing portion is closer to the bottom portion than the melting portion is.

DETAILED DESCRIPTION

Background to Present Disclosure

Figure 1A:
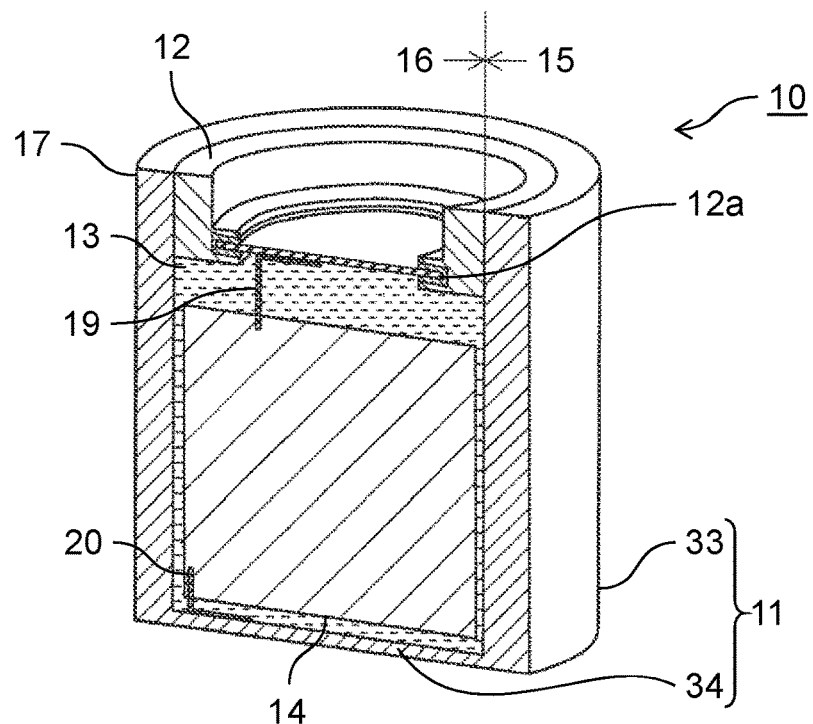
FIG. 1A is a schematic view of a battery according to Exemplary Embodiment 1 of the present disclosure.

The battery sealing method described in Japanese Patent Unexamined Publication No. 7-105933 includes forming a ridge under the sealing member and forming a caulking portion on the sealing member, so that the dimension of the battery in the longitudinal direction in the vicinity of the sealing member increases. As a result, the volume of the battery can increases and the energy density of the battery decreases. Therefore, in order to solve the problems in the related art, the present inventors have examined a sealed type battery that can seal the battery can without forming a caulking portion by joining the battery can and the sealing member, for example, by welding.

However, in a case where the battery can is sealed by welding, when the sealing member is inserted into an opening edge portion of the battery can, an electrolytic solution rises toward the opening side of the battery can between the battery can and the sealing member due to a capillary phenomenon. The electrolytic solution is mixed into the melting portion that is formed by welding, which causes a welding defect.

The rise of the electrolytic solution will be described in detail. In the present specification, "upper" is a direction from the bottom portion of the battery can toward the melting portion in the battery after the battery can is filled with the electrolytic solution. Further, the "rise of the electrolytic solution" occurs upward. The rise of the electrolytic solution occurs due to a capillary phenomenon in a space between the inner peripheral surface of the opening edge portion and the outer peripheral surface of the sealing member. In the capillary phenomenon, the surface tension and the gravity corresponding to the volume of the electrolytic solution in the space act in the electrolytic solution in the space between the inner peripheral surface of the opening edge portion and the outer peripheral surface of the sealing member. The electrolytic solution rises to a position where the surface tension and the gravity are balanced.

Subsequently, the mixing of the electrolytic solution into the melting portion will be described in detail. After the sealing member is inserted into the battery can, a part of the battery can and a part of the sealing member are melted to form a melting portion. When the electrolytic solution caused to rise due to the capillary phenomenon reaches the height at which the melting portion is formed, the electrolytic solution enters the melting portion, which is melted when welding, and the electrolytic solution is mixed into the melting portion. Such mixing of the electrolytic solution causes, for example, a welding defect such as an opening defect.

An object of the present disclosure is to provide a battery capable of improving energy density in order to solve the above problems. The present inventors have examined the following batteries as batteries that can solve the above problems.

A battery according to one aspect of the present disclosure includes a metal battery can, an electrode body, an electrolytic solution, and a sealing member. The battery can has a tubular portion having an opening edge portion at one end of the tubular portion and a bottom portion closing the other end of the tubular portion. The electrode body is accommodated in the battery can. The battery can is filled with the electrolytic solution. The sealing member seals the opening edge portion of the tubular portion of the battery can. The sealing member is disposed such that an outer peripheral surface of the sealing member faces an inner peripheral surface of the opening edge portion. A part of the inner peripheral surface of the opening edge portion and a part of the outer peripheral surface of the sealing member are joined by a melting portion. Further, a preventing portion, which prevents the electrolytic solution from rising toward a position, in which the melting portion is formed, between the inner peripheral surface of the opening edge portion and the outer peripheral surface of the sealing member, is provided on the outer peripheral surface of the sealing member. The preventing portion is closer to the bottom portion than the melting portion is.

According to the present disclosure, it is possible to improve the energy density of the battery.

Specifically, according to such a configuration, the capillary phenomenon can be prevented, and the rise of the electrolytic solution toward the melting portion between the inner peripheral surface of the opening edge portion and the outer peripheral surface of the sealing member can be prevented. By preventing the rise of the electrolytic solution, it is possible to prevent the electrolytic solution from being mixed into the melting portion. Therefore, it is possible to reduce a welding defect due to mixing of the electrolytic solution into the melting portion. In a case where the electrolytic solution is mixed into the melting portion, when the electrolytic solution rapidly expands in volume due to heating of the melting portion, solidification occurs in a state where the shape of the melting portion is deformed, resulting in a welding defect. Due to the reduction of the welding defects, the battery can is able to be sealed by welding and the sealing member is able to be fixed to the battery can. Since it is not necessary to provide the annular-shaped ridge (also referred to as a reduced diameter portion) on the inner peripheral surface of the battery can and the caulking portion at the open end of the battery can like batteries in the related art, it is possible to reduce the distance between the electrode body and the sealing member. As a result, the volume of the battery can is able to be reduced, and the energy density of the battery, which is the ratio of the battery energy to the volume of the battery can, is improved.

Further, as a preventing portion, a groove portion over the entire circumference of the outer peripheral surface of the sealing member may be provided.

According to such a configuration, in the groove portion, the width of the space between the inner peripheral surface of the opening edge portion and the outer peripheral surface of the sealing member becomes large. The larger the width of the space, the larger the gravity per unit height acting on the electrolytic solution, so that the rise of the electrolytic solution due to the capillary phenomenon is prevented. As a result, it is possible to prevent the electrolytic solution from being mixed into the melting portion. Further, since the groove portion is provided over the entire circumference of the outer peripheral surface of the sealing member, the rise of the electrolytic solution can be prevented in a wider range on the outer periphery of the sealing member by the groove portion that is formed intermittently.

Further, a direction in which the groove portion extends has an angle that is larger than 0° and smaller than 90° with respect to a circumferential direction of the outer peripheral surface of the sealing member. By providing the angle, the effect that the electrolytic solution easily falls in the direction of gravity can be obtained.

Further, the groove portion may be formed such that the volume of forming the groove portion is larger than the estimated amount of adhered electrolytic solution on the inner peripheral surface of the opening edge portion.

According to such a configuration, even when the electrolytic solution rises due to the capillary phenomenon, the groove portion is not filled with the electrolytic solution, and the electrolytic solution does not rise higher than the groove portion. Since the groove portion is positioned on the side of the bottom portion of the battery can from the melting portion, it is possible to prevent the electrolytic solution from being mixed into the melting portion.

Further, as the preventing portion, a surface processing portion having a water repellent effect or an oil repellent effect with respect to the electrolytic solution may be provided over the entire circumference of the outer peripheral surface of the sealing member.

According to such a configuration, the wettability of the electrolytic solution with respect to the sealing member in the surface processing portion decreases. Due to the decrease in the wettability of the electrolytic solution with respect to the sealing member, the surface tension of the electrolytic solution and the gravity for balancing with the surface tension are reduced, and the rise of the electrolytic solution due to the capillary phenomenon can be prevented. Therefore, it is possible to prevent the electrolytic solution from being mixed into the melting portion. Further, since the surface processing portions are provided over the entire circumference of the outer peripheral surface of the sealing member, the rise of the electrolytic solution can be prevented in a wider range on the outer periphery of the sealing member by the surface processing portions that are formed intermittently.

Further, the surface processing portion may be provided such that the wetting angle of the electrolytic solution is equal to or larger than 90° with respect to the sealing member.

According to such a configuration, the electrolytic solution does not rise higher than the surface processing portion. Since the surface processing portion is positioned on the side of the bottom portion of the battery can from the melting portion, it is possible to prevent the electrolytic solution from being mixed into the melting portion.

Further, two preventing portions, a first preventing portion and a second preventing portion, may be provided. The first preventing portion may be provided on the outer peripheral surface of the sealing member, and the second preventing portion may be provided on the inner peripheral surface of the opening edge portion. The first preventing portion is closer to the bottom portion than the melting portion is. The second preventing portion is closer to the bottom portion than the melting portion is.

According to such a configuration, the rise of the electrolytic solution can be further prevented between the inner peripheral surface of the opening edge portion and the outer peripheral surface of the sealing member.

Hereinafter, Exemplary Embodiments according to the present disclosure will be described with reference to the accompanying drawings. The present disclosure is not limited to the Exemplary Embodiments described below.

Exemplary Embodiment 1

Figure 1B:
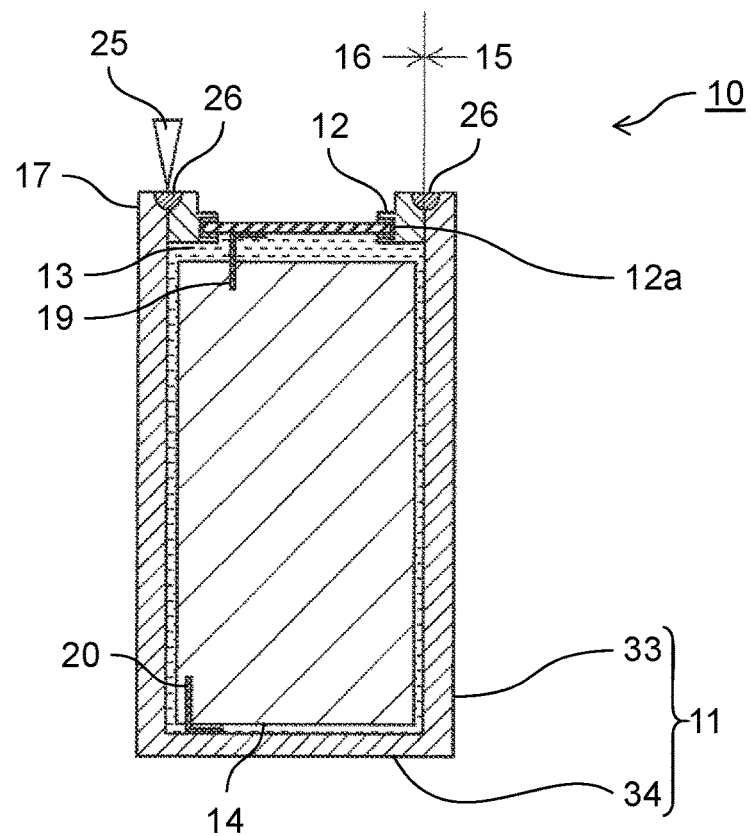
FIG. 1B is a cross-sectional view of the battery according to Exemplary Embodiment 1.

Hereinafter, Exemplary Embodiment 1 will be described in detail with reference to the drawings. FIG. 1A shows a schematic view of battery 10 according to Exemplary Embodiment 1. FIG. 1B shows a cross-sectional view of battery 10 according to Exemplary Embodiment 1.

As shown in FIG. 1A, battery 10 according to Exemplary Embodiment 1 is constituted by battery can 11, sealing member 12, electrolytic solution 13, electrode body 14, positive electrode tab 19, and negative electrode tab 20.

Battery can 11 has tubular portion 33 having opening edge portion 17 at one end and bottom portion 34 closing the other end of tubular portion 33. In Exemplary Embodiment 1, tubular portion 33 is, for example, a cylindrical portion, and battery can 11 is a bottomed metal container having a cylindrical shape with an open upper end on the drawing. Negative electrode tab 20 is connected to bottom portion 34. Electrode body 14 is accommodated in battery can 11, and battery can 11 is filled with electrolytic solution 13. Battery can 11 is sealed by sealing member 12. The space inside battery can 11 in which electrode body 14 and electrolytic solution 13 are accommodated is a sealed space. Therefore, battery 10 according to Exemplary Embodiment 1 is a sealed type battery.

Sealing member 12 includes a central part having a disk shape and an outer peripheral part having a ring shape raised above the central part, and the outer peripheral edge of the central part is fixed to the inner peripheral edge of the outer peripheral part via gasket 12a. Positive electrode tab 19 is connected to the central part of sealing member 12, and the central part serves as the positive electrode portion of battery 10. Sealing member 12 has an outer peripheral surface that is disposed to face the inner peripheral surface of battery can 11. Sealing member 12 is inserted into battery can 11 such that the height of the upper end of sealing member 12 on the drawing and the height of the upper end of battery can 11 on the drawing are substantially aligned with each other. In a state of being inserted in this way, a part of battery can 11 facing the outer peripheral surface of sealing member 12 corresponds to opening edge portion 17. The inner peripheral surface of opening edge portion 17 is referred to as first facing surface 15, and the outer peripheral surface of sealing member 12 is referred to as second facing surface 16. Although not shown in FIG. 1A, the outer peripheral surface of sealing member 12 is provided with a preventing portion for preventing the rise of electrolytic solution 13 between the inner peripheral surface of opening edge portion 17 and the outer peripheral surface of sealing member 12. It will be described later in the description in FIG. 2A.

In the description of the present specification, the shape of battery can 11 is set to a cylinder but the shape of battery can 11 is not limited to such a shape. For example, it may be an elliptical cylinder or a polygonal cylinder. In the description of the present specification, the shape of sealing member 12 is set to a disk shape in which the outer peripheral part is raised above the central part but the shape of sealing member 12 is not limited to such a shape, and the shape of sealing member 12 may be a shape such that the outer peripheral surface thereof is inserted inside opening edge portion 17 to face the inner peripheral surface of opening edge portion 17 of battery can 11 and opening edge portion 17 can be sealed.

Electrode body 14 emits or absorbs electrons or ions into battery can 11 depending on the material thereof. Electrode body 14 has two types, a positive electrode and a negative electrode, and has a three-layer structure in which a separator, which blocks the movement of the electrons or ions, is sandwiched therebetween. Electrolytic solution 13 is a medium through which the electrons or ions emitted from electrode body 14 can move. Further, positive electrode tab 19 and negative electrode tab 20 through which the electrons or ions flow are connected to the positive electrode and the negative electrode of electrode body 14, respectively.

Battery 10 according to Exemplary Embodiment 1 is manufactured through the following processes. Electrode body 14 is inserted into battery can 11, and electrolytic solution 13 is injected. Further, at the time of injecting electrolytic solution 13, electrolytic solution 13 is once poured into battery can 11 up to the height of melting portion 26 shown in FIG. 1B. After the injection, the solution level falls to the height of melting portion 26 or less by the impregnation process. Through this series of processes, electrolytic solution 13 once adheres to the entire surface of opening edge portion 17 of battery can 11. When sealing member 12 is inserted in battery can 11, electrolytic solution 13 already adhering to opening edge portion 17 is easily sucked up by the capillary phenomenon. Subsequently, as shown in FIG. 1B, sealing member 12 is inserted into battery can 11 so that the upper end of the inner peripheral surface of opening edge portion 17 on the drawing and the upper end of the outer peripheral surface of sealing member 12 on the drawing are substantially aligned with each other. As a result, first facing surface 15 and second facing surface 16 face each other. Subsequently, for example, a part of sealing member 12 and a part of opening edge portion 17 are irradiated with laser 25 for welding. Specifically, the upper ends, in which sealing member 12 and opening edge portion 17 are substantially aligned with each other on the drawing, are irradiated with laser 25 for welding from above sealing member 12 and melted. Further, laser 25 is scanned along the circumferential direction of the outer periphery of sealing member 12. By the irradiation, melting portion 26 is formed, and the outer periphery of sealing member 12 is joined to the inner periphery of opening edge portion 17. As a result, battery can 11 is sealed, and sealing member 12 is fixed to battery can 11.

Figure 2A:
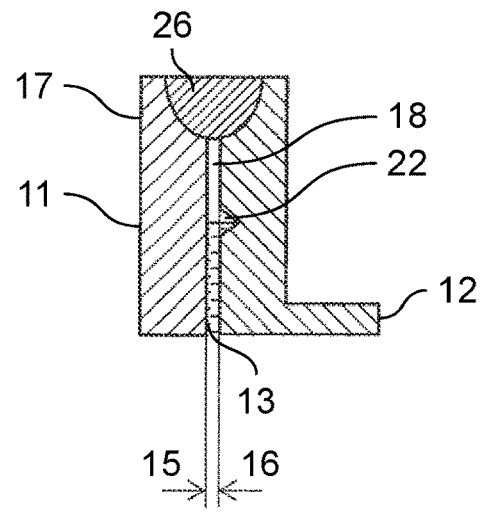
FIG. 2A is a schematic cross-sectional view of the vicinity of a groove portion in the battery according to Exemplary Embodiment 1.
Figure 2B:
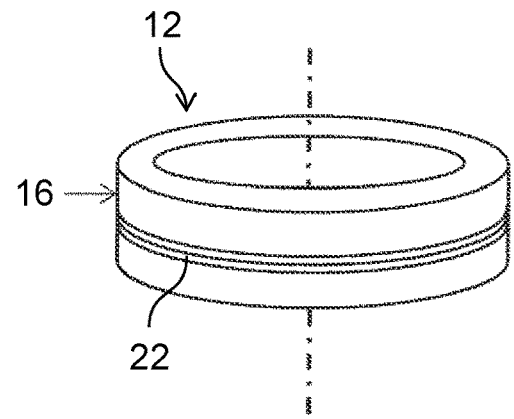
FIG. 2B is a schematic view of a sealing member in the battery according to Exemplary Embodiment 1.

FIG. 2A shows a schematic cross-sectional view of the vicinity of groove portion 22 in battery 10 according to Exemplary Embodiment 1. FIG. 2B shows a schematic view of sealing member 12 in battery 10 according to Exemplary Embodiment 1.

As shown in FIG. 2A, since it is difficult to process the inner peripheral surface of opening edge portion 17 and the outer peripheral surface of sealing member 12 into the same shape, space 18 is created between opening edge portion 17 and sealing member 12. Further, the width of space 18 on the drawing in the horizontal direction (hereinafter, the width of space 18), that is, a distance between first facing surface 15 and second facing surface 16 on the drawing in the horizontal direction is small with respect to the outer diameter of sealing member 12. In such space 18, there is a possibility that the electrolytic solution rises due to the capillary phenomenon as described above.

As shown in FIG. 2B, in battery 10 of Exemplary Embodiment 1, groove portion 22 is provided on the outer peripheral surface of sealing member 12 in order to prevent the rise of electrolytic solution 13 due to the capillary phenomenon in such space 18.

Groove portion 22 is formed on the outer peripheral surface of sealing member 12 so as to extend along the circumferential direction of the outer peripheral surface thereof. Further, groove portion 22 is formed as one continuous groove over the entire circumference of sealing member 12. Since groove portion 22 is provided over the entire circumference of the outer peripheral surface of sealing member 12, groove portion 22 is present on the outer peripheral surface of sealing member 12 in a direction orthogonal to the circumferential direction. Further, groove portion 22 is positioned on the side of bottom portion 34 of battery can 11 from melting portion 26.

In Exemplary Embodiment 1, groove portion 22 is formed as a preventing portion that prevents electrolytic solution 13 from rising toward a position in which melting portion 26 is formed between the inner peripheral surface of opening edge portion 17 and the outer peripheral surface of sealing member 12. The width of space 18 becomes large due to groove portion 22. Further, electrolytic solution 13 is stored in groove portion 22. The larger the width of space 18, the larger the gravity per unit height acting on electrolytic solution 13 stored therein, and the rise of electrolytic solution 13 in space 18 is prevented.

On the outer peripheral surface of sealing member 12, groove portion 22 may be provided on the side of bottom portion 34 of battery can 11 from melting portion 26. Further, on the outer peripheral surface of sealing member 12, groove portion 22 may be formed at a position away from melting portion 26. For example, in a continuous output fiber laser having a wavelength of 1070 nm, when the power is defined as 700 W, the speed is defined as 125 mm/s, and the spot diameter is defined as 0.7 mm, the penetration depth of melting portion 26 is substantially 0.25 mm. By forming groove portion 22 at a position away from the position of the penetration depth by 0.1 mm or more, it is possible to prevent vaporized electrolytic solution 13 from being mixed into melting portion 26. Therefore, by providing a predetermined distance between groove portion 22 and melting portion 26, it is possible to prevent electrolytic solution 13 in groove portion 22 from being vaporized by the heat of welding and mixed into melting portion 26.

Groove portion 22 may be provided not only on the outer peripheral surface of sealing member 12, but also on the inner peripheral surface of opening edge portion 17, or on both the outer peripheral surface of sealing member 12 and the inner peripheral surface of opening edge portion 17. Groove portion 22 is not limited to one continuous groove. For example, a plurality of continuous grooves may be provided. Further, a plurality of intermittent grooves may be provided such that at least one groove is present in a direction orthogonal to the circumferential direction.

Figure 2C:
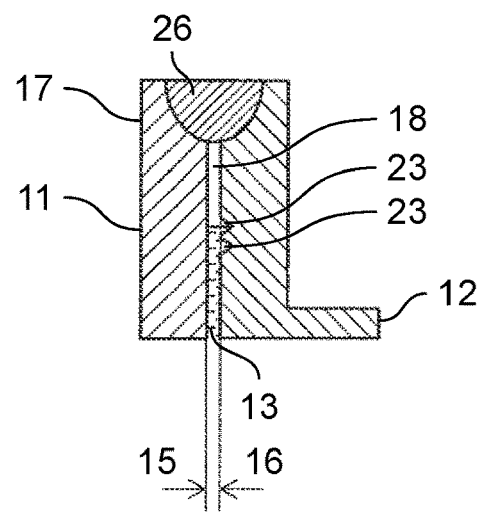
FIG. 2C is a schematic cross-sectional view of the vicinity of two groove portions in the battery according to Exemplary Embodiment 1.

FIG. 2C shows a modification example of groove portion 22 of Exemplary Embodiment 1, and shows a schematic cross-sectional view of the vicinity of two groove portions 23 of the modification example. This modification example includes two groove portions 23 instead of groove portion 22. Further, two groove portions 23 extend in the circumferential direction of the outer peripheral surface of sealing member 12, and extend over the entire circumference thereof. Two groove portions 23 are provided so as to be positioned on the side of bottom portion 34 of battery can 11 from melting portion 26.

Figure 2D:
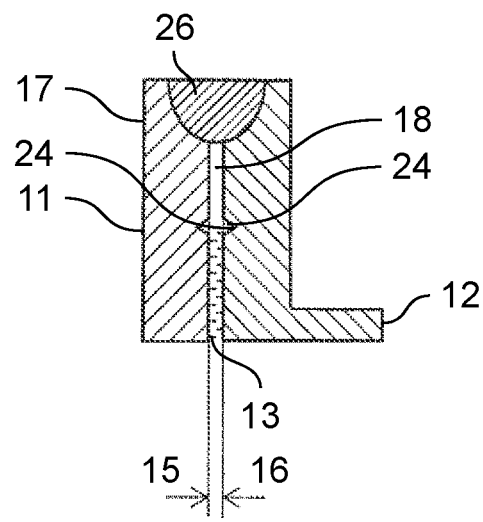
FIG. 2D is a schematic cross-sectional view of the vicinity of groove portions on both sides in the battery according to Exemplary Embodiment 1.

FIG. 2D also shows a modification example of groove portion 22 of Exemplary Embodiment 1, and shows a schematic cross-sectional view of the vicinity of groove portions 24 on both sides of the modification example. In this modification example, instead of groove portion 22, groove portions 24 on both sides, which are formed on both sides of sealing member 12 side and opening edge portion 17 side, are provided. Further, regarding groove portions 24 on both sides, groove portion 24 on sealing member 12 side extends in the circumferential direction of the outer peripheral surface thereof and is provided over the entire circumference thereof, and groove portion 24 on the inner peripheral surface of opening edge portion 17 side extends in the circumferential direction of the inner peripheral surface thereof and is provided over the entire circumference thereof. Groove portions 24 on both sides are provided so as to be positioned on the side of bottom portion 34 of battery can 11 from melting portion 26. By providing groove portions 24 on both sides, the rise of electrolytic solution 13 can be further prevented.

Figure 2E:
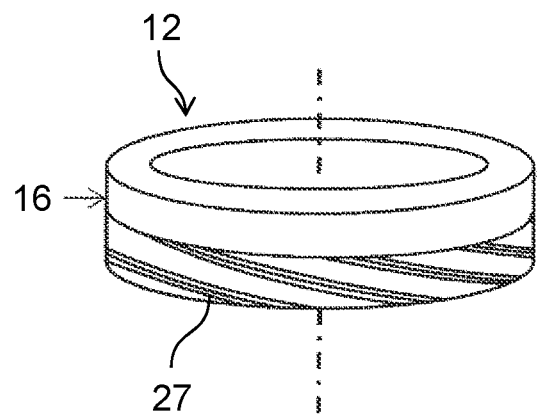
FIG. 2E is a schematic view of a sealing member having an angled groove portion in the battery according to Exemplary Embodiment 1.
Figure 2F:
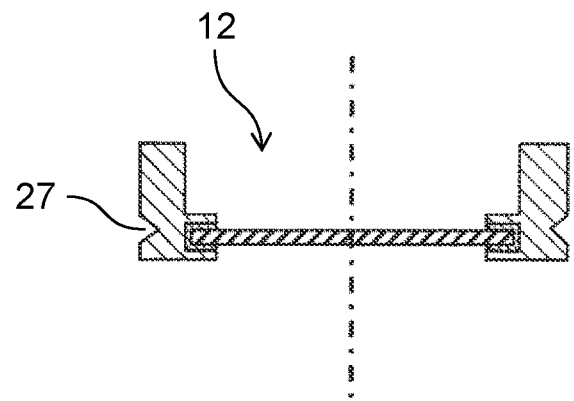
FIG. 2F is a cross-sectional view of FIG. 2E.

Further, FIGS. 2E and 2F show another modification example of groove portion 22 of Exemplary Embodiment 1, and show a schematic view and a cross-sectional view of sealing member 12 having angled groove portion 27. As shown in FIGS. 2E and 2F, the direction in which angled groove portion 27 extends may have an angle larger than 0° and smaller than 90° with respect to the circumferential direction of the outer peripheral surface of sealing member 12. For example, FIG. 2E shows angled groove portion 27 in which the extending direction of angled groove portion 27 has an angle of 30° with respect to the circumferential direction of the outer peripheral surface of sealing member 12.

Electrolytic solution 13 can be stored in groove portions 22 to 24 and 27. Groove portions 22 to 24 and 27 may be formed such that the volume capable of storing electrolytic solution 13 in groove portions 22 to 24 and 27, is larger than the amount of adhered electrolytic solution. In the present specification, the "amount of adhered electrolytic solution" means the volume of electrolytic solution 13 adhering to the inner peripheral surface of opening edge portion 17 when sealing member 12 is inserted. By forming the volume of groove portions 22 to 24 and 27 so as to be larger than the amount of adhered electrolytic solution, electrolytic solution 13 does not rise higher than groove portions 22 to 24 and 27. Therefore, it is possible to prevent electrolytic solution 13 from being mixed into melting portion 26.

For example, the dimension in the direction orthogonal to the circumferential direction of the outer peripheral surface of sealing member 12 is defined as 2.0 mm, and the inner diameter of battery can 11 is defined as 10 mm. Further, it is assumed that electrolytic solution 13 uniformly adheres to the entire surface with a thickness of 0.05 mm within a range of opening edge portion 17. The amount of adhered electrolytic solution in this case is substantially $3.2 \times 10^{-9}$ m$^3$. For example, in a case where groove portion 22 is formed as shown in FIG. 2A, when one groove is formed by cutting processing such that the cross section becomes a triangle with a width of 1 mm and a depth of 1 mm, the volume of groove portion 22 is equal to or larger than the amount of adhered electrolytic solution.

Further, for example, under the same conditions as described above, in a case where a plurality of grooves are formed as shown in FIG. 2C, when two grooves having a width of 1 mm and a depth of 0.5 mm are formed as two groove portions 23, the volume of two groove portions 23 becomes equal to or larger than the amount of adhered electrolytic solution. Therefore, in the formation of two groove portions 23, groove portions 23 can be formed with a groove depth smaller than that of groove portion 22. Further, also in the formation of groove portions 24 on both sides, since a plurality of grooves are formed, groove portions 24 can be similarly formed at a groove depth smaller than that of groove portion 22.

The forming method of groove portions 22 to 24 and 27 is not particularly limited, and may be appropriately selected depending on the materials of sealing member 12 and battery can 11. Examples of the forming method include the cutting processing, pressing processing, and laser processing.

Effects

In battery 10 according to Exemplary Embodiment 1, a preventing portion that prevents electrolytic solution 13 from rising toward a position in which melting portion 26 is formed in space 18 between the inner peripheral surface of opening edge portion 17 and the outer peripheral surface of sealing member 12. The preventing portion can prevent electrolytic solution 13 from rising due to the capillary phenomenon, and as a result, prevent electrolytic solution 13 from being mixed into melting portion 26 during the welding between battery can 11 and sealing member 12. Therefore, it is possible to reduce a welding defect due to mixing of electrolytic solution 13 into melting portion 26. Therefore, battery can 11 and sealing member 12 can be joined by welding to seal battery can 11, and sealing member 12 can be fixed to battery can 11. Therefore, since it is not necessary to form the caulking portion with sealing member 12 and battery can 11 as in a battery in the related art, it is possible to reduce the distance between electrode body 14 and sealing member 12. Therefore, it is possible to provide battery 10 with improved energy density.

When groove portions 22 to 24 and 27 are formed on the outer peripheral surface of sealing member 12 as preventing portions for preventing the rise of electrolytic solution 13, in groove portions 22 to 24 and 27, the width of space 18 between first facing surface 15 and second facing surface 16 becomes large. Further, electrolytic solution 13 is stored in groove portions 22 to 24 and 27. The larger the width of space 18, the larger the gravity per unit height acting on electrolytic solution 13 stored therein. Therefore, the height of electrolytic solution 13 in which gravity balances with the surface tension is reduced, and the rise of electrolytic solution 13 is prevented. Therefore, it is possible to prevent electrolytic solution 13 from being mixed into melting portion 26 when welding is performed between battery can 11 and sealing member 12.

Further, since groove portions 22 to 24 and 27 are provided over the entire circumference of the outer peripheral surface of sealing member 12, the rise of electrolytic solution 13 can be prevented in a wider range on the outer periphery of sealing member 12 by the groove portions that are formed intermittently.

Further, a direction in which groove portions 22 to 24 and 27 extend may have an angle that is larger than 0° and smaller than 90° with respect to a circumferential direction of the outer peripheral surface of sealing member 12. By providing the angle, the effect that electrolytic solution 13 easily falls in the direction of gravity can be obtained.

Further, the volume of forming by groove portions 22 to 24 and 27 may be formed so as to be larger than the amount of adhered electrolytic solution. By forming groove portions 22 to 24 and 27 in this way, even when electrolytic solution 13 rises, groove portions 22 to 24 and 27 are not filled with electrolytic solution 13, and electrolytic solution 13 does not rise higher than groove portions 22 to 24 and 27. Further, groove portions 22 to 24 and 27 are provided on the side of bottom portion 34 of battery can 11 from melting portion 26. Therefore, electrolytic solution 13 does not reach melting portion 26 and it is possible to prevent electrolytic solution 13 from being mixed into melting portion 26 when welding is performed between battery can 11 and sealing member 12.

Exemplary Embodiment 2

In battery 40 of Exemplary Embodiment 2, it is provided with a form different from that of groove portions 22 to 24 and 27 as a preventing portion that prevents the electrolytic solution from rising toward a position in which the melting portion is formed between the inner peripheral surface of the opening edge portion and the outer peripheral surface of the sealing member. In battery 40 of Exemplary Embodiment 2, the configuration other than the preventing portion is the same as that of battery 10 of Exemplary Embodiment 1. In Exemplary Embodiment 2, the same or equivalent configurations as those in Exemplary Embodiment 1 will be described with the same reference numerals. Further, in Exemplary Embodiment 2, the points different from Exemplary Embodiment 1 will be mainly described, and the description overlapping with Exemplary Embodiment 1 will be omitted.

Figure 3A:
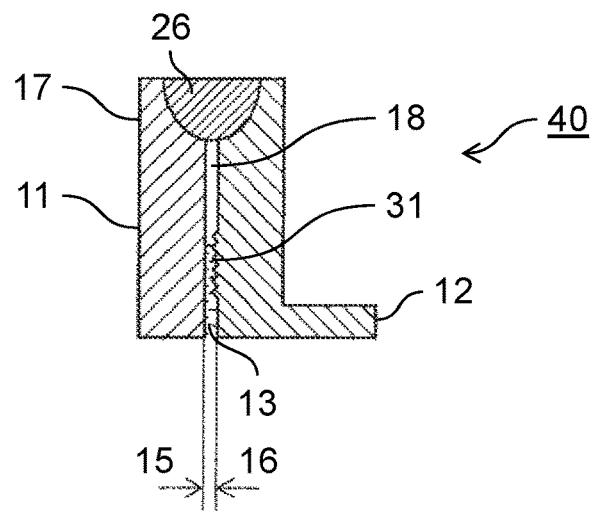
FIG. 3A is a schematic cross-sectional view of the vicinity of a surface processing portion in a battery according to Exemplary Embodiment 2 of the present disclosure.
Figure 3B:
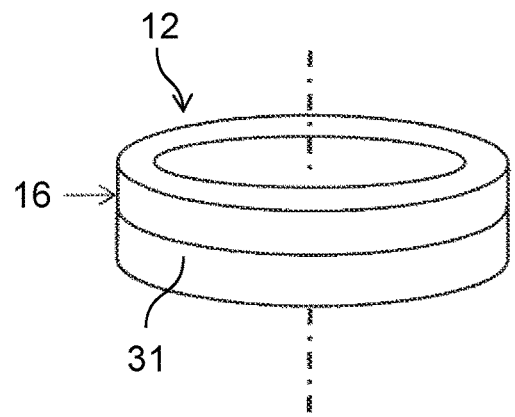
FIG. 3B is a schematic view of a sealing member in the battery according to Exemplary Embodiment 2.

Hereinafter, Exemplary Embodiment 2 will be described in detail with reference to the drawings. FIG. 3A shows a schematic cross-sectional view of the vicinity of surface processing portion 31 in battery 40 according to Exemplary Embodiment 2. FIG. 3B shows a schematic view of sealing member 12 in battery 40 according to Exemplary Embodiment 2.

As shown in FIG. 3A, in battery 40 of Exemplary Embodiment 2, space 18 is created between opening edge portion 17 and sealing member 12 as in battery 10 of Exemplary Embodiment 1. In such space 18, there is a possibility that electrolytic solution 13 rises due to the capillary phenomenon as described above.

As shown in FIG. 3B, in battery 40 of Exemplary Embodiment 2, surface processing portion 31, which has an oil repellent effect with respect to electrolytic solution 13, is provided on the outer peripheral surface of sealing member 12 in order to prevent the rise of electrolytic solution 13 due to the capillary phenomenon in such space 18.

Surface processing portion 31 is formed on the outer peripheral surface of sealing member 12 so as to extend along the circumferential direction of the outer peripheral surface thereof. Further, surface processing portion 31 is formed as one continuous surface processing portion over the entire circumference of sealing member 12. Since surface processing portion 31 is provided over the entire circumference of the outer peripheral surface of sealing member 12, surface processing portion 31 is present on the outer peripheral surface of sealing member 12 in a direction orthogonal to the circumferential direction. Further, surface processing portion 31 is positioned on the side of bottom portion 34 of battery can 11 from melting portion 26.

In Exemplary Embodiment 2, surface processing portion 31 is formed as a preventing portion. Surface processing portion 31 has an oil repellent effect with respect to electrolytic solution 13 and reduces the wettability of electrolytic solution 13. When the wettability of electrolytic solution 13 is small, the surface tension of electrolytic solution 13 and the gravity for balancing with the surface tension are reduced, and the rise of electrolytic solution 13 in space 18 is prevented. Instead of surface processing portion 31, a surface processing portion having a water repellent effect may be provided.

The reduction in the wettability of electrolytic solution 13 by surface processing portion 31 will be described in detail. For example, a capillary phenomenon is conceivable mainly due to ethylene carbonate, which is the main component of the electrolytic solution of the secondary battery. It is known that the rising height h due to the capillary phenomenon can be represented by the equation (1) by using density ρ, surface tension T, wetting angle θ, radius r of space 18 (half the width of space 18 is regarded as the radius), and gravitational acceleration g.

$$h = 2T \cos \theta / \rho g r \qquad (1)$$

As a calculation when ethylene carbonate is used at 20° C., density ρ is defined as 1.320 g/cm$^3$, surface tension T is defined as 0.02 N/m, radius r of space 18 is defined as 0.01 mm, and gravitational acceleration g is defined as 9.8 m/s$^2$. When the surface processing is performed such that wetting angle θ is 90°, the rising height h of electrolytic solution 13 in space 18 is theoretically 0 mm. Therefore, the rise of electrolytic solution 13 and the mixing into melting portion 26 due to the capillary phenomenon can be prevented. On the other hand, since the rising height h becomes substantially 5.4 mm when wetting angle θ is 89°, it is desirable that the wetting angle of electrolytic solution 13 by surface processing portion 31 is equal to or larger than 90°.

Further, as in Exemplary Embodiment 1, on the outer peripheral surface of sealing member 12, surface processing portion 31 may be provided on the side of bottom portion 34 of battery can 11 from melting portion 26. Further, on the outer peripheral surface of sealing member 12, surface processing portion 31 may be formed at a position away from melting portion 26. For example, in a continuous output fiber laser having a wavelength of 1070 nm, when the power is defined as 700 W, the speed is defined as 125 mm/s, and the spot diameter is defined as 0.7 mm, the penetration depth of melting portion 26 is substantially 0.25 mm. By forming surface processing portion 31 at a position away from the position of the penetration depth by 0.1 mm or more, it is possible to prevent vaporized electrolytic solution 13 from being mixed into melting portion 26. Therefore, by providing a predetermined distance between surface processing portion 31 and melting portion 26, it is possible to prevent electrolytic solution 13 in the vicinity of surface processing portion 31 from being vaporized by the heat of welding and mixed into melting portion 26.

As in Exemplary Embodiment 1, surface processing portion 31 may be provided not only on the outer peripheral surface of sealing member 12, but also on the inner peripheral surface of opening edge portion 17, or on both the outer peripheral surface of sealing member 12 and the inner peripheral surface of opening edge portion 17. Surface processing portion 31 is not limited to one continuous surface processing portion. For example, a plurality of continuous surface processing portions 31 may be provided. Further, a plurality of intermittent surface processing portions 31 may be provided such that at least one surface processing portion 31 is present in a direction orthogonal to the circumferential direction.

Figure 3C:
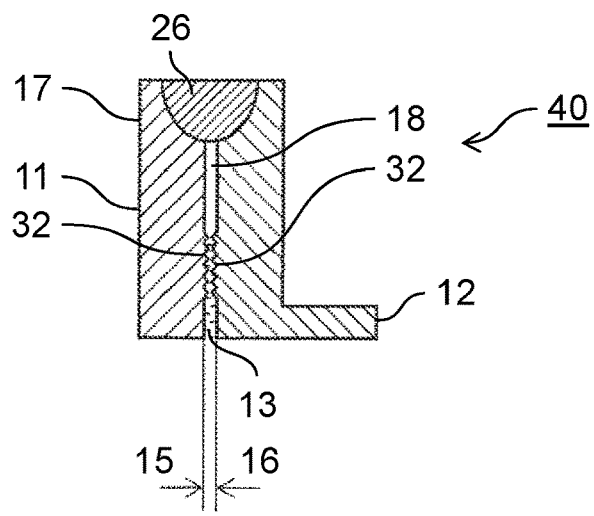
FIG. 3C is a schematic cross-sectional view of the vicinity of surface processing portions on both sides in the battery according to Exemplary Embodiment 2.

Further, FIG. 3C shows a modification example of surface processing portion 31 of Exemplary Embodiment 2, and shows a schematic cross-sectional view of the vicinity of surface processing portions 32 on both sides. In this modification example, instead of surface processing portion 31, surface processing portions 32 on both sides, which are formed on both sides of sealing member 12 side and opening edge portion 17 side, are provided. Further, regarding surface processing portions 32 on both sides, surface processing portion 32 on sealing member 12 side extends in the circumferential direction of the outer peripheral surface thereof and is provided over the entire circumference thereof, and surface processing portion 32 on the inner peripheral surface of opening edge portion 17 side extends in the circumferential direction of the inner peripheral surface thereof and is provided over the entire circumference thereof. Surface processing portions 32 on both sides are provided so as to be positioned on the side of bottom portion 34 of battery can 11 from melting portion 26.

The method of forming surface processing portion 31 and surface processing portions 32 on both sides is limited to the surface fine patterning processing. In coating processing, the coating material is peeling off from sealing member 12 and mixed into melting portion 26 at the time of welding, which causes a welding defect. The method of the surface fine patterning processing is not particularly limited, and may be appropriately selected depending on the materials of sealing member 12 and battery can 11. Examples of the method of surface fine patterning processing include the cutting processing, nanoimprint processing, and laser processing.

Effects

In battery 40 according to Exemplary Embodiment 2, surface processing portion 31 having a water repellent effect or an oil repellent effect is formed on sealing member 12 as a preventing portion.

By surface processing portion 31, the wettability of electrolytic solution 13 with respect to sealing member 12 in surface processing portion 31 decreases. Due to the decrease in the wettability of electrolytic solution 13 with respect to sealing member 12, the surface tension of electrolytic solution 13 and the gravity for balancing with the surface tension are reduced, and the rise of electrolytic solution 13 due to the capillary phenomenon can be prevented. Therefore, it is possible to prevent electrolytic solution 13 from being mixed into melting portion 26 when welding is performed between battery can 11 and sealing member 12.

Further, surface processing portion 31 may be provided over the entire circumference of the outer peripheral surface of sealing member 12. Therefore, by surface processing portion 31, which is formed intermittently, the rise of electrolytic solution 13 can be prevented in a wide range on the outer periphery of sealing member 12.

For example, surface processing portion 31, which has a water repellent effect or an oil repellent effect such that the wetting angle of electrolytic solution 13 is equal to or larger than 90° with respect to sealing member 12, may be formed on sealing member 12. When the wetting angle is equal to or larger than 90°, electrolytic solution 13 does not rise higher than surface processing portion 31. Further, surface processing portion 31 is provided on the side of bottom portion 34 of battery can 11 from melting portion 26. Therefore, electrolytic solution 13 does not reach melting portion 26 and it is possible to prevent electrolytic solution 13 from being mixed into melting portion 26 when welding is performed between battery can 11 and sealing member 12.

By appropriately combining any of the above-mentioned various Exemplary Embodiments, the effects of each can be achieved.

The battery according to the present disclosure can be used for various can-shaped batteries, and is useful as a power source for, for example, a portable device, a hybrid vehicle, an electric vehicle, or the like.

What is claimed is:

1. A battery comprising:
a metal battery can that has a tubular portion having an opening edge portion at a first end of the tubular portion and a bottom portion closing a second end of the tubular portion;
an electrode body that is in the battery can;
an electrolytic solution that fills the battery can; and
a sealing member that has an outer peripheral surface facing an inner peripheral surface of the opening edge portion of the tubular portion and is configured to seal the opening edge portion,
wherein:
a part of the inner peripheral surface of the opening edge portion and a part of the outer peripheral surface of the sealing member are joined by a melting portion;
a preventing portion is on the outer peripheral surface of the sealing member, the preventing portion being configured to prevent the electrolytic solution from rising toward a position, in which the melting portion is formed, between the inner peripheral surface of the opening edge portion and the outer peripheral surface of the sealing member;
a distance between the preventing portion and the bottom portion is shorter than a distance between the melting portion and the bottom portion;
the preventing portion includes a groove portion defined in the outer peripheral surface of the sealing member;
the preventing portion and the inner peripheral surface of the opening edge portion demarcate a first space; and
the groove portion is configured to store therein a portion of the electrolytic solution passing through a second space between the inner peripheral surface of the opening edge portion and the outer peripheral surface of the sealing member.

2. The battery of claim 1,
wherein the groove portion is defined over an entire circumference of the outer peripheral surface of the sealing member.

3. The battery of claim 1,
wherein a direction in which the groove portion extends has an angle larger than 0° and smaller than 90° with respect to a circumferential direction of the outer peripheral surface of the sealing member.

4. The battery of claim 1,
wherein a volume of the groove portion is larger than an amount of the electrolytic solution adhering on the inner peripheral surface of the opening edge portion.

5. A battery comprising:
a metal battery can that has a tubular portion having an opening edge portion at a first end of the tubular portion and a bottom portion closing a second end of the tubular portion;
an electrode body that is in the battery can;
an electrolytic solution that fills the battery can; and
a sealing member that has an outer peripheral surface facing an inner peripheral surface of the opening edge portion of the tubular portion and is configured to seal the opening edge portion,
wherein:
a part of the inner peripheral surface of the opening edge portion and a part of the outer peripheral surface of the sealing member are joined by a melting portion;
a preventing portion is on the outer peripheral surface of the sealing member, the preventing portion being configured to prevent the electrolytic solution from rising toward a position, in which the melting portion is formed, between the inner peripheral surface of the opening edge portion and the outer peripheral surface of the sealing member;
a distance between the preventing portion and the bottom portion is shorter than a distance between the melting portion and the bottom portion;
the preventing portion includes a surface processing portion defined in the outer peripheral surface of the sealing member over an entire circumference of the outer peripheral surface of the sealing member; and
the surface processing portion is surface patterning processed so as to have a water repellent effect with respect to the electrolytic solution or an oil repellent effect with respect to the electrolytic solution.

6. The battery of claim 5,
wherein the surface processing portion has the water repellent effect or the oil repellent effect such that a wetting angle of the electrolytic solution is equal to or larger than 90° with respect to the sealing member.

7. The battery of claim 1, wherein:
the groove portion is a first groove portion and the portion of the electrolytic solution passing through the second space between the inner peripheral surface of the opening edge portion and the outer peripheral surface of the sealing member is a first portion;
the preventing portion further includes a second groove portion defined in the outer peripheral surface of the sealing member;
the second groove portion and the inner peripheral surface of the opening edge portion demarcate a third space; and
the second groove portion is configured to store therein a second portion of the electrolytic solution passing through the second space between the inner peripheral surface of the opening edge portion and the outer peripheral surface of the sealing member.

8. The battery of claim 5,
the surface processing portion is cutting processed so as to have the water repellent effect or the oil repellent effect.

9. The battery of claim 5,
the surface processing portion is nanoimprint processed so as to have the water repellent effect or the oil repellent effect.

10. The battery of claim 5,
the surface processing portion is laser processed so as to have the water repellent effect or the oil repellent effect.

* * * * *